United States Patent [19]

Msihid

[11] Patent Number: 5,134,351
[45] Date of Patent: Jul. 28, 1992

[54] SPEED CHANGING DEVICE FOR A MULTI-POLAR, CONSTANT FLUX ELECTRIC MOTOR, AND A MOTORIZED VENTILATING FAN UNIT EQUIPPED WITH SUCH A DEVICE

[75] Inventor: Marcel Msihid, Paris, France

[73] Assignee: Valeo Thermique Moteur, Le Mesnil-Saint-Denis, France

[21] Appl. No.: 659,075

[22] Filed: Feb. 22, 1991

[30] Foreign Application Priority Data

Feb. 26, 1990 [FR] France .................. 90 02359

[51] Int. Cl.⁵ ............................................ H02K 23/20
[52] U.S. Cl. ......................................... 318/541; 388/836; 310/148
[58] Field of Search ............... 310/127, 128, 136, 137, 310/148, 149, 150, 151, 182, 224, 225; 318/244, 245, 292, 541, 542; 388/834, 835, 836, 928

[56] References Cited

U.S. PATENT DOCUMENTS

| | | |
|---|---|---|
| 517,105 | 3/1894 | Henderson . |
| 542,667 | 7/1895 | Wightman . |
| 669,299 | 3/1901 | Bassett . |
| 857,165 | 6/1907 | Eichberg . |
| 1,406,367 | 2/1922 | Fynn . |
| 1,416,265 | 5/1922 | Charlet . |
| 1,857,202 | 5/1932 | Lee . |
| 2,199,601 | 5/1940 | Wallis . |
| 3,387,151 | 6/1968 | Selgin .................................. 310/46 |
| 3,820,000 | 6/1974 | Smith ............................. 318/139 X |
| 4,827,897 | 5/1989 | Yamada et al. ..................... 388/836 |

FOREIGN PATENT DOCUMENTS

| | | |
|---|---|---|
| 0076206 | 4/1983 | European Pat. Off. . |
| 1450247 | 10/1965 | France . |
| 2605156 | 4/1988 | France . |
| 1393705 | 5/1975 | United Kingdom . |

Primary Examiner—Bentsu Ro
Attorney, Agent, or Firm—Dennison, Meserole, Pollack & Scheiner

[57] ABSTRACT

This invention relates to a speed changing device, giving at least two motor speeds, for an electric motor supplied with direct current. It is applicable to motorized ventilating fan units designed for the air cooling of heat engines, mainly for automobiles.

The speed changing device is characterized in that it includes a contactor having at least two positions whereby, in the first position of the contactor, not more than three of the brushes are supplied with electrical current so as to obtain a first motor speed (low speed), while in the second position of the contactor, all of the brushes are supplied with electrical current so as to obtain the greater motor speed (high speed).

13 Claims, 1 Drawing Sheet

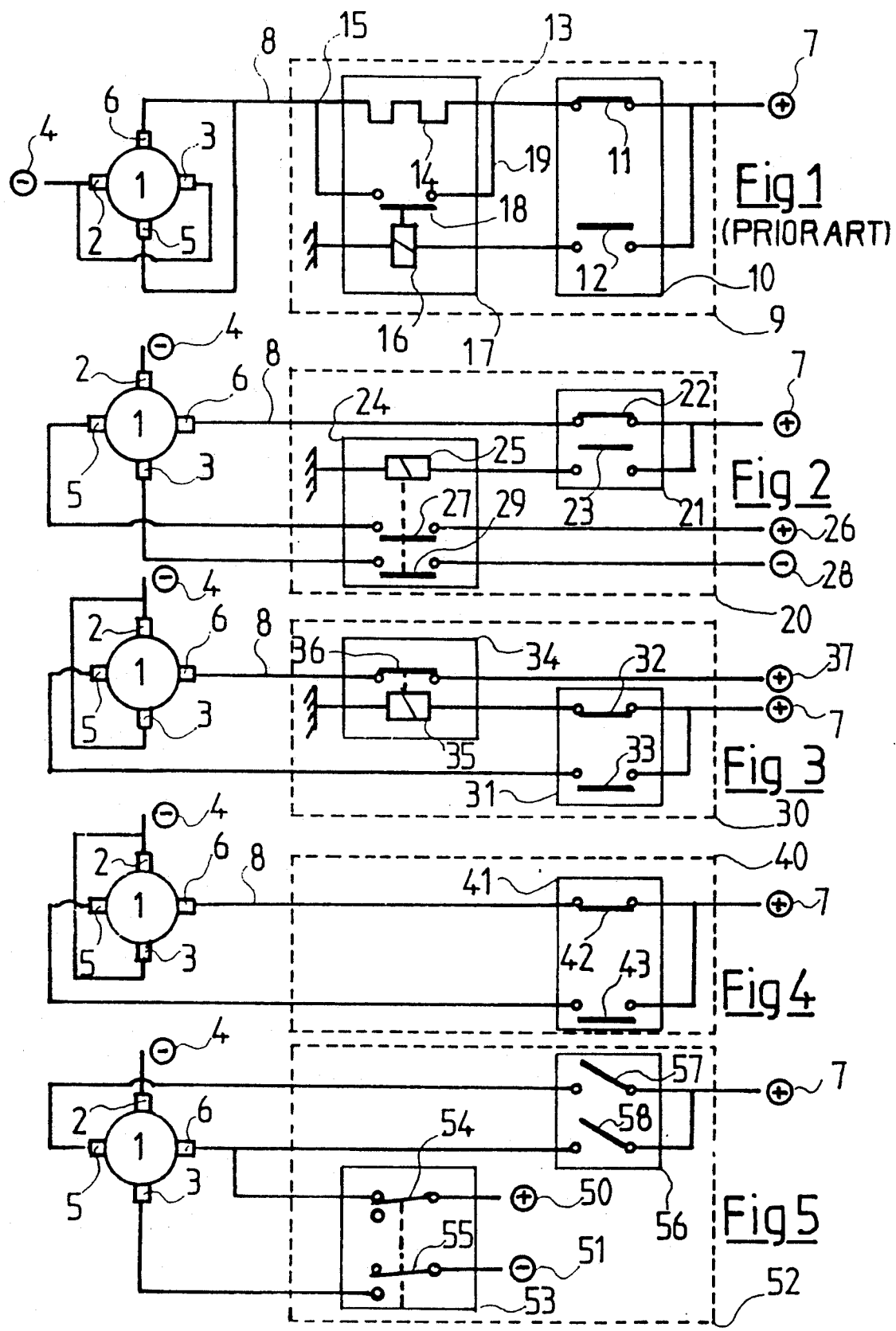

SPEED CHANGING DEVICE FOR A MULTI-POLAR, CONSTANT FLUX ELECTRIC MOTOR, AND A MOTORIZED VENTILATING FAN UNIT EQUIPPED WITH SUCH A DEVICE

FIELD OF THE INVENTION

This invention relates to a speed changing device for an electric motor. It is applicable in particular in motorised ventilating fan units as used in automobiles, of the kind including an electric motor driving a ventilating fan.

BACKGROUND OF THE INVENTION

The temperature of the engine of an automobile is variable under different conditions. Thus, on hilly roads and in hot weather, the engine tends to give off large quantities of heat. For cooling it, a heat exchange fluid is used which flows through the engine and which removes the heat thereby recovered to the outside, but more particularly after having passed through a heat exchanger through which there also flows a stream of cooling air, which is usually atmospheric air taken from outside. That air flow can be accelerated so as to produce a high rate of heat transfer, by the rotor of a ventilating fan which is driven by an electric motor of the direct current kind, the assembly of fan and electric motor being referred to as a motorised ventilating fan unit.

The supply of electric current to the electric motor is provided by means of the battery and the alternator of the vehicle, and is controlled by means of an electrical control circuit which enables the temperature of the engine to be regulated. In particular, a relatively small cooling air flow occurs during normal operation. In the majority of cases, it is already known that quiet operation of such an installation is perfectly feasible.

However, in operation under extreme conditions, it is necessary to increase the flow of useful air for cooling the hot parts of the engine. The motorised ventilating fan unit, to this end, must then receive a command such as to increase the cooling air flow. However, the noise produced by the motorised ventilating fan unit is then considerable, which is a nuisance to the occupants of the vehicle.

Electric motors of motorised ventilating fan units are constant flux motors in which the speed of rotation of the motor is not dependent on reaction torque over a wide range of values. Such motors occupy little space, and they consume only a small quantity of current, while their selling price is relatively low. For these very reasons, however, it is not easy to viably apply the electronic control means of the prior art, because the slightly increased cost of the motor also means that the control of its speed of rotation needs to be made less costly.

One object of the present invention is to provide a control means for the speed of the constant flux electric motor which will be reduced in price.

In the main application in respect of which the invention is provided, automobile engines achieve high temperatures only comparatively rarely. In the prior art, it has already been proposed to provide control devices which enable two speeds of rotation of the electric motor of the motorised ventilating fan unit to be obtained.

Such speed changing devices in general include an electrical resistor, which is brought into circuit at low speed and which is arranged to reduce the voltage at the terminals of at least one of the supply brushes for the armature of the electric motor. This voltage reduction results in a reduction in the speed of rotation of the motor from a nominal (or high) speed to a lower speed.

These arrangements in the prior art have two principal drawbacks. The first of these is that the electrical resistor is a relatively expensive component, the price of which accounts for approximately 30% of the cost of the speed changing device. The second main drawback is that in moderate operation of the vehicle, in order not to upset the thermal balance due to the resistance, there is a general requirement that this resistor should be disposed in an air flow of a predetermined direction: however, this is made difficult because of the size then necessary for the housings in which the motorised ventilating fan units are installed.

The present invention provides a remedy for the drawbacks of the prior art.

STATEMENT OF THE INVENTION

The invention provides a speed changing device for an electric motor of a motorised ventilating fan unit, where the said motor is of the kind having an encapsulated winding arranged to be supplied through at least four brushes and to be controlled in such a way that it is able to rotate at at least two different speeds, the speed changing device being characterised in that it includes a contactor having at least two positions, whereby in the first position of the said contactor, not more than three of the brushes are supplied with electric current so as to obtain a first motor speed, namely a low speed, and whereby in the second position of the said contactor, all the brushes are supplied with electric current in order to obtain a greater motor speed, namely a high speed.

The present invention will be more clearly understood on a reading of the description which follows, which is given by way of example only and with reference to the accompanying drawings, which consist of a series of block diagrams.

BRIEF DESCRIPTION OF THE DRAWINGS

FIG. 1 shows a speed changing device according to the prior art.

FIG. 2 shows a speed changing device in a first embodiment of the invention.

FIG. 3 shows a speed changing device in a second embodiment of the invention.

FIG. 4 shows a speed changing device in a third embodiment of the invention.

FIG. 5 shows a speed changing device in a fourth embodiment of the invention.

DESCRIPTION OF PREFERRED EMBODIMENTS OF THE INVENTION

The drawings show a quadi-polar motor having four brushes for supplying direct current to the armature. It will however be understood that the invention is not limited to any particular number of poles in this type of constant flux d.c. machine.

In the speed changing device according to the prior art which is shown in block form in FIG. 1, a constant flux quadri-polar motor 1 has a first brush 2 and a second brush 3, which are connected to at least one source of supply 4 of negative polarity. Two further brushes, 5 and 6 respectively, are connected to the positive pole 7 of the above mentioned d.c. supply source. On the line 8 which connects the brushes 5 and 6 with the positive supply terminal 7, a speed changing device 9 is interposed.

When applied to a motorised ventilating fan unit, the speed changing device is responsive to changes in the thermal environment. As has already been described, the fan of the unit is adapted to modify at least one feature of this environment, for example the temperature of the engine of the vehicle. To this end, a thermal contact switch 10, having two switch contacts 11 and 12, is used. The first contact 11 is for supplying the motor 1 in a low speed mode, while the second contact 12 is for supplying the motor 1 in a high speed mode, the latter being in fact the nominal speed of the quadri-polar constant flux motor 1.

A first terminal of an electrical resistor 14 is connected to the circuit breaker contact 11 of the thermal contact switch 10, and its second terminal 15 is connected through the line 8 to the brushes 5 and 6, of positive polarity, of the quadri-polar motor 1.

In operation under controlled thermal conditions, the resistor 14 takes the current for the armature windings connected to the brushes 5 and 6. For this reason, some fraction of the current is consumed by Joule effect in the resistor 14. The reduction in voltage at the terminals of the resistor leads to weakening of the motor torque, and for a given mechanical reaction torque, a reduction in the speed of rotation of the motor with respect to its nominal speed. When the measured thermal conditions reach a certain value, the second circuit breaker contact 12 of the thermal contact switch 10 closes, which causes the electromagnetic coil 16 of a relay 17, the relay contact 18 of which short circuits the resistor 14, to be energised. For this reason, the current demanded by the brushes 5 and 6 at the pole 7 of the d.c. supply source passes via the resistor short circuit line 19, and the voltage at the terminals of the brushes 5 and 6 is restored to its nominal value. A stable supply is thus provided to the four poles of the motor, which then operates in a nominal mode. The motorised ventilating fan unit reaches its full speed so as then to modify the thermal environment as required.

In order to overcome the drawbacks discussed above in the prior art arrangements, the present invention enables recourse to a costly electrical resistor to be avoided, together with the problem of locating the resistor in the unit (such location being difficult to achieve).

In the first embodiment of the present invention shown in FIG. 2, the quadri-polar motor 1 has brushes indicated respectively by the reference numerals 2, 3, 5 and 6. Only the single brush 2 is connected to the negative pole 4 of the d.c. supply source. In a preferred arrangement, the constant flux d.c. electric motor which is employed is a motor with encapsulated windings.

The brush 6 is connected through the line 8 to the positive pole 7 of the d.c. supply source. A speed changing device 20 is interposed on the line 8. The device 20 includes a thermal contactor 21 which has two positions and which is similar to the thermal contact switch 10 shown in FIG. 1, performing the same function. However, the switch contact 22 of the contactor 21 is directly connected through the line 8 to the brush 6, without the current passing through an electrical resistor.

The second switch contact 23 of the thermal contactor 21 is connected to a relay 24 which includes an electromagnetic coil 25. The latter, in response to the thermal conditions in the environment, connects a first pole 26 of the supply, having positive polarity, to the brush 5 via the relay circuit breaker contact 27, and connects a second pole 28 of the supply, having negative polarity, to the brush 3 via the relay circuit breaker contact 29. When the thermal conditions reach a predetermined first threshold value, the thermal contactor 21 closes its contact 22, with its contact 23 being open. The current enters via the brush 6 and leaves only via the brush 2, which causes the motor torque to be reduced and therefore causes the speed of rotation to be the low motor speed, i.e. less than the nominal speed. In this condition, the brushes 3 and 5 are disconnected from any source of supply.

When the thermal conditions reach a predetermined second threshold value, the thermal contactor 21 then closes its contact 23, the contact 22 remaining closed. The effect of this is to connect the brushes 5 and 3 electrically to the positive pole 26 and the negative pole 28 respectively. In this second position, all of the brushes are supplied with electric current in a stable manner, and the nominal speed of the motor, or high motor speed, is thus obtained.

FIG. 3 shows a second embodiment of the present invention. It has already been noted that in the first embodiment of the invention, the electrical resistor found in the speed changing device of the prior art has been dispensed with. However, an electromagnetic relay having two contacts has to be added in the embodiment of the invention shown in FIG. 2, whereas it will have been observed that the speed changing device of the prior art had only a single relay contact. In order to improve still more the potential for reduction in cost, the embodiment shown in FIG. 3 is an arrangement in which the relay again has only one contact.

To this end, in the arrangement shown in FIG. 3, as in the prior art arrangement seen in FIG. 1, the opposed brushes 2 and 3 are connected to the negative terminal 4 of the d.c. supply source. In addition, the brush 6 is connected to a positive supply terminal 37 via the speed changing device 30 shown in FIG. 3. In this embodiment, the positive terminal 7 of a d.c. supply source is connected to a thermal contactor 31, having two switch contacts 32 and 33 in the same manner as has been described for FIGS. 1 and 2 in respect of the items referenced 10 and 21.

In low speed operation, the switch contact 32 of the thermal contactor 31 is closed, the effect of which is to energise the coil 35 of the relay 34, which has a single relay contact 36. This contact 36 thus becomes closed, and the line 8 is thereby connected to the positive terminal 37 of the d.c. supply source.

For high speed operation, the thermal contactor 31 closes its second switch contact 33 when it detects that a predetermined threshold value has been reached; the effect of this is to connect the positive supply terminal 7 to the brush 5. It will be realised that, when the system is operating at low speed, current flows in three of the supply brushes 2, 3 and 6 of the armature. However, the brush which is supplied through the line 8 takes a current equal in value to the sum of those found at the brushes 2 and 3. For this reason, the motor operates at low speed in an unstable mode.

In another embodiment, shown in FIG. 4, not only the resistor, but also the electromagnetic relay, is absent. To this end, the brushes 2 and 3 are connected to the negative terminal 4 of the d.c. supply source, while the brushes 5 and 6 are connected to the positive terminal 7 through a speed changing device 40.

The speed changing device 40 consists only of a thermal contactor 41 having two switch contacts 42 and 43. Thus, in low speed operation, the switch contact 42 of the thermal contactor 41 is closed, and the brush 6 is connected to the positive pole 7 via the line 8. For high speed operation, the thermal contactor 41 closes its second switch contact 43, so that the brush 5 is then also connected to the positive pole 7. For this reason, at low speed, the current passes through the brushes 2, 3 and 6, while at high speed the current passes through all the brushes for supplying the armature.

In the embodiment shown in FIG. 5, the brush 2 is connected directly to the negative terminal 4, while the brush 6 can be connected either to the positive terminal 7 or to a positive terminal 50. In addition, the brush 5 may be connected to the positive terminal 7 and the brush 3 may be connected to a negative terminal. A speed changing device 52 selects these various connections.

The speed changing device 52 comprises a first changeover element 53, which enables the brush 6 to be connected to the positive terminal 50 through a contact 54, while disconnecting the brush 3 from the negative terminal 51 by means of a contact 55. The speed changing device also includes a second changeover element 56 which enables the brushes 5 and 6 to be connected to the positive terminal 7 through contacts 57 and 58.

These two changeover elements 53 and 56 are arranged to operate in a configuration in which, when one of these elements is actuated, the other is released. Thus at low speed, the changeover element 53 is actuated in such a way that the supply to the brush 6 is carried out via the contact 54, while the brush 3 is disconnected from the negative terminal 51 by the contact 55. The current thus passes only from the brush 6 towards the brush 4.

For high speed operation, the changeover element 53 is returned to its initial state, shown in FIG. 5, in which the brush 6 is no longer supplied from the positive terminal 50, but the brush 3 is connected to the negative terminal 51 via the contact 55. The changeover element 56 is then actuated in such a way that the contacts 57 and 58 enable the brushes 5 and 6 to be connected simultaneously to the terminal 7, so that the current is thus taken by all four brushes.

In a further embodiment of the invention, the electromagnetic contacts and the thermal contact switch are performed by semiconductor type switching devices or interruptors. These are power transistors operating in a changeover mode: they function in a manner that is substantially equivalent to that described above.

The invention thus facilitates adaptation, in particular to the use of centralised electronics, using a multi-signal bus line. Similarly, the state of the motorised ventilating fan unit can be monitored.

The invention is capable of being used in fields other than that of motorised ventilating fan units for automobiles. In particular, the thermal contact switch may be replaced by any suitable type of controlled interruptor. The device according to the invention may employ several d.c. supply sources, and may even be enhanced with voltages which are adjustable in accordance with appropriate commands.

In general, the electric motors used in the performance of this invention have an armature which includes a plurality of current paths supplied through brushes.

The means whereby the device according to the invention is switched off comprises at least one controllable semiconductor interruptor, for example a switching transistor, which is polarised in the open state in such a way as to open or close selectively the connection of at least one brush of the armature at its normal polarisation.

What is claimed is:

1. A speed changing device for an electric motor for a motorised ventilating fan unit, the motor having an encapsulated winding and at least four brushes for supplying electric current to said winding, the motor being arranged to operate at at least two different speeds, the speed changing device comprising:
a first contactor having at least two positions including a first position and a second position, the speed changing device having means for connecting it electrically with selected brushes of the motor whereby in said first position of the first contactor no more than three of the brushes are supplied with electric current, so as to obtain a first motor speed, and in said second position of the first contactor, all the brushes are supplied with electric current in order to obtain a greater motor speed, and means for supplying a signal representing thermal enviromental conditions to at least one contactor of the device.

2. A device according to claim 1, further comprising an electromagnetic relay, the first contactor having at least two switch contacts arranged to be closed in succession, one of said switch contacts being connected to the relay, so as to bring at least one additional brush not previously supplied with a voltage into circuit.

3. A device according to claim 2, wherein the relay has a coil and a relay contact arranged to be closed by said coil, said switch contact of the first contactor connected to the relay being connected to the coil of the relay, so that the device then supplies electric current to no more than three of the brushes.

4. A device accoding to claim 2, wherein the relay comprises a coil and two relay contacts arranged to be closed by said coil, said switch contact of the first contactor connected to the relay being connected to the coil of the relay, so that to supply two of said brushes with electric current.

5. A device according to claim 1, further comprising a second contactor associated with the first contactor, for enabling direct current to be supplied to all of said brushes.

6. A device according to claim 5, wherein the second contactor has two switch contacts arranged to be closed simultaneously.

7. A motorised ventilating fan unit comprising:
a constant flux DC voltage operable motor with armature windings and first, second, third and fourth brushes spaced 90 degrees apart for commutating said brushes to the armature windings, at least one DC voltage applied to the first of the brushes; and
two position speed changing means for applying another DC voltage to the second of the brushes in a first position to operate the motor at a first speed and for applying said one voltage to the third of the brushes and said another voltage to the fourth of the brushes in a second position to operate the motor at a second speed.

8. The unit according to claim 7 wherein said speed changing means comprises a thermal contactor and a relay, said contactor applying only said voltage in said first position and said relay operated by said thermal contactor to apply said one voltage to the third and said another voltage to the fourth brush in said second position.

9. The unit according to claim 7 wherein said speed changing means comprises a first and a second changeover element having a first switch contact for applying only said another voltage to said second brush in the first position and having a second switch contact for applying only said one voltage to said third brush, said second changeover element applying said another voltage to the second and fourth brush.

10. A motorised ventilating fan unit comprising:
a constant flux DC voltage operable motor with armature windings and first, second, third and fourth brushes spaced 90 degrees apart for commutating said brushes to the armature windings, at least one DC voltage applied in parallel to the first and third of the brushes; and two position speed changing means for applying another DC voltage to only the second of the brushes in a first position to operate the motor at a first speed and for applying in addition said another voltage to the fourth of the brushes in a second position to operate the motor at a second speed.

11. The unit according to claim 10 wherein said speed changing means comprises a relay and a thermal contactor for operating said relay to apply said another voltage in said first position and said thermal contactor applies said another voltage to the fourth brush in said second position.

12. The unit according to claim 10 wherein said speed changing means comprises a thermal contactor having a first switch contact for applying only said another voltage to the second brush in the first position and having a second switch contact for applying the another voltage to the third brush.

13. The unit according to claim 7 or claim 10 wherein said one DC voltage is of negative polarity and said another voltage is of positive polarity of a DC voltage source.

* * * * *